(12) United States Patent
Vasa et al.

(10) Patent No.: US 10,875,045 B2
(45) Date of Patent: Dec. 29, 2020

(54) VARIABLE CROSS-SECTION COMPLIANCE MECHANISM

(71) Applicant: The Boeing Company, Chicago, IL (US)

(72) Inventors: Dhananjay B. Vasa, Columbus, OH (US); John E. Miller, Ladson, SC (US); Silas Lawton Studley, Seattle, WA (US); Shane E. Arthur, Kirkland, WA (US); Kyle S. Biondich, Seattle, WA (US); Bennett M. Moriarty, Seattle, WA (US); Raymond C. Eng, Burien, WA (US); Matthew H. Mellin, Charleston, SC (US)

(73) Assignee: The Boeing Company, Chicago, IL (US)

( * ) Notice: Subject to any disclaimer, the term of this patent is extended or adjusted under 35 U.S.C. 154(b) by 518 days.

(21) Appl. No.: 15/381,644

(22) Filed: Dec. 16, 2016

(65) Prior Publication Data

US 2018/0169687 A1    Jun. 21, 2018

(51) Int. Cl.
*B05B 13/02* (2006.01)
*B05B 13/04* (2006.01)
(Continued)

(52) U.S. Cl.
CPC ...... *B05B 13/0278* (2013.01); *B05B 13/0436* (2013.01); *B05B 13/0457* (2013.01);
(Continued)

(58) Field of Classification Search
CPC .......................... B41M 5/0088; B41J 3/4073
See application file for complete search history.

(56) References Cited

U.S. PATENT DOCUMENTS

2002/0024544 A1* 2/2002 Codos ............... B41J 3/4073
                                                       347/8
2005/0066890 A1    3/2005 Wetzel
(Continued)

FOREIGN PATENT DOCUMENTS

| CN | 105413921 A | 3/2016 |
|---|---|---|
| DE | 102014006991 A1 | 12/2014 |
| JP | 2011025392 A | 2/2011 |

OTHER PUBLICATIONS

U.S. Appl. No. 15/287,167, filed Oct. 6, 2016 entitled "Actuated Print Head Assembly for a Contoured Surface".
(Continued)

*Primary Examiner* — Dah-Wei D. Yuan
*Assistant Examiner* — Stephen A Kitt
(74) *Attorney, Agent, or Firm* — von Briesen & Roper, s.c.

(57) ABSTRACT

A surface treatment support structure assembly for treating a contoured surface includes a support structure array formed from a plurality of base structures, each base structure being operably coupled with respect to one another and configured to slide along a longitudinal axis and rotate about a laterally translating axis which is perpendicular to the longitudinal axis. The support structure array further includes at least one applicator head coupled to each base structure of the support structure array, each of the at least one applicator head being configured to treat the contoured surface. Additionally, a base structure actuator is operatively coupled to and configured to manipulate each base structure along the longitudinal axis and the laterally translating axis such that the support structure array is adjusted relative to the contoured surface.

20 Claims, 6 Drawing Sheets

(51) Int. Cl.
  *B41M 5/00* (2006.01)
  *B41J 3/407* (2006.01)
  *B05D 7/00* (2006.01)
  *B24B 19/26* (2006.01)
  *G01B 11/06* (2006.01)
  *G01B 11/25* (2006.01)
  *B64F 5/00* (2017.01)

(52) U.S. Cl.
  CPC ............... *B05D 7/00* (2013.01); *B24B 19/26* (2013.01); *B41J 3/4073* (2013.01); *B41M 5/0088* (2013.01); *G01B 11/0608* (2013.01); *G01B 11/2518* (2013.01); *B64F 5/00* (2013.01)

(56) References Cited

U.S. PATENT DOCUMENTS

| | | | |
|---|---|---|---|
| 2007/0062383 A1* | 3/2007 | Gazeau | ............... B41J 3/4073 101/35 |
| 2011/0132548 A1 | 6/2011 | De Mattia | |
| 2015/0360799 A1 | 12/2015 | Luca | |

OTHER PUBLICATIONS

Search Report for related European Application No. 17203702.0, report dated May 22, 2018.

* cited by examiner

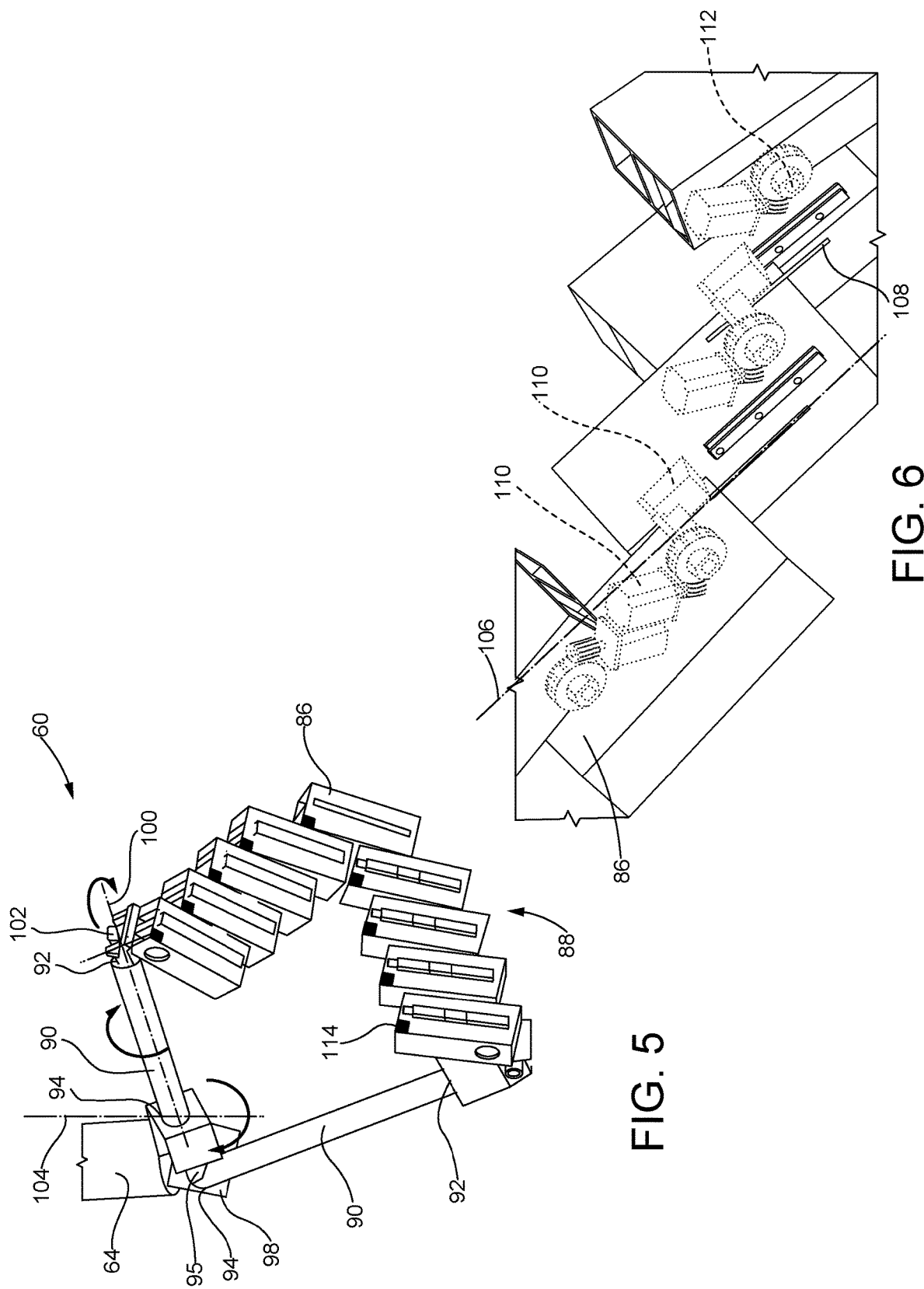

VARIABLE CROSS-SECTION COMPLIANCE MECHANISM

FIELD

The present disclosure relates generally to automated surface treatment assemblies and methods for treating a surface, and more specifically to automated surface treatment support structure assembly systems and methods for treating a contoured surface.

BACKGROUND

Treating and coating structural surfaces of machines, such as commercial aircraft, is a long and extensive process. Surface treatment often requires coating a structural surface that includes a variety of large contoured surfaces. Furthermore, coating the structural surfaces includes applying multiple layers of coatings for engineering properties, as well as to apply a decorative livery. The decorative livery is applied using a complex process which requires a series of masking operations followed by applying colored paints or coatings where they are needed. These masking and painting operations are serially repeated until the exterior surface treatment is completed. Performing these processes on large areas with a variety of contoured surfaces, therefore, requires a significant amount of time and resources.

SUMMARY

In accordance with one aspect of the present disclosure a surface treatment support structure assembly for treating a contoured surface is disclosed. The surface treatment support structure assembly includes a support structure array formed from a plurality of base structures, each base structure being operably coupled with respect to one another and configured to slide along a longitudinal axis and rotate about a laterally translating axis which is perpendicular to the longitudinal axis. The support structure array further includes at least one applicator head coupled to each base structure of the support structure array, each of the at least one applicator head being configured to treat the contoured surface. Additionally, a base structure actuator is operatively coupled to and configured to manipulate each base structure along the longitudinal axis and the laterally translating axis such that the support structure array is adjusted relative to the contoured surface.

In accordance with another aspect of the present disclosure, a method for treating a contoured surface with a surface treatment support structure assembly is disclosed. The method includes forming a support structure array from a plurality of base structures, each base structure operably coupled with respect to one another and configured to slide along a longitudinal axis and rotate about a laterally translating axis which is perpendicular to the longitudinal axis. The method further includes coupling at least one applicator head to each base structure of the support structure array, each of the at least one applicator head configured to apply a surface treatment to the contoured surface. Additionally, the method includes coupling a base structure actuator to each base structure and manipulating each base structure along the longitudinal axis and the laterally translating axis such that the support structure array is adjusted relative to the contoured surface.

In accordance with yet another aspect of the present disclosure, a surface treatment support structure assembly system for treating an exterior surface of an airplane is disclosed. The surface treatment support structure assembly system includes a plurality of support structure arrays formed from a plurality of base structures, each base structure operably coupled with respect to one another and configured to slide along a longitudinal axis and rotate about a laterally translating axis which is perpendicular to the longitudinal axis. The surface treatment support structure assembly system further includes at least one applicator head coupled to each base structure and each of the at least one applicator head is configured to treat a contoured surface along the exterior surface of the airplane. Moreover, a base structure actuator is operatively coupled to and configured to manipulate each base structure along the longitudinal axis and the laterally translating axis. Additionally, the surface treatment support structure assembly system includes a controller communicably coupled to the base structure actuator and programmed to operate the base structure actuator to manipulate the plurality of support structure arrays relative to the contoured surface along the exterior surface of the airplane.

The features, functions, and advantages disclosed herein can be achieved independently in various embodiments or may be combined in yet other embodiments, the details of which may be better appreciated with reference to the following description and drawings.

BRIEF DESCRIPTION OF THE DRAWINGS

FIG. 5 is a perspective view of an additional embodiment of the surface treatment support structure assembly in accordance with the present disclosure;

FIG. 6 is an enlarged perspective view an embodiment of the base structures of the surface treatment support structure assembly of FIG. 5 in accordance with the present disclosure;

It should be understood that the drawings are not necessarily to scale, and that the disclosed embodiments are illustrated diagrammatically, schematically, and in some cases in partial views. In certain instances, details which are not necessary for an understanding of the disclosed methods and apparatuses or which render other details difficult to perceive may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both methods and devices for carrying out the disclosure. Actual scope of the disclosure is as defined by the appended claims.

Figure 1:
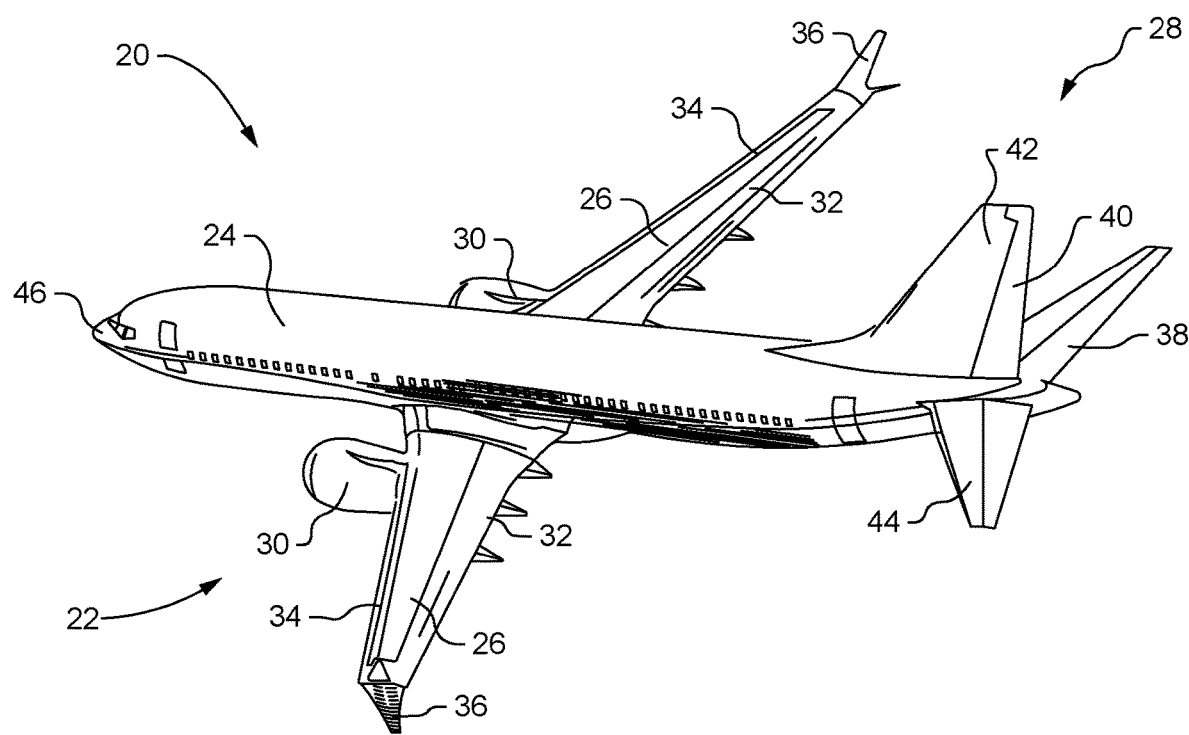
FIG. 1 is a perspective view of an exemplary vehicle constructed in accordance with the present disclosure.

Referring to FIG. 1, a vehicle 20 is illustrated. One non-limiting example of the vehicle 20 is that of an aircraft; however the present disclosure applies to other types of vehicles and machines as well. As illustrated, the vehicle 20 is configured with an airframe 22 which includes a fuselage 24, wings 26, and a tail section 28. Additionally, one or more propulsion units 30 are coupled to each wing 26 in order to propel the vehicle 20 in a direction of travel. Furthermore, each wing 26 is fixedly attached to the fuselage 24 and the propulsion units 30 are attached to an underside surface of the wing 26, however other attachment locations of the propulsion units 30 are possible. In some embodiments, each wing 26 is positioned at a substantially centered position along the fuselage 24, and each wing 26 is configured to include a plurality of flaps 32, leading edge devices 34, and peripheral edge devices 36 (i.e., winglets). Moreover, during operation of the vehicle 20, the flaps 32, leading edge devices 34 and peripheral edge devices 36 are capable of being adjusted in a plurality of positions in order to control and stabilize the vehicle 20. For example, the flaps 32 and leading edge devices 34 are adjustable in several different positions to produce the desired lift characteristics of the wings 26. Additionally, the tail section 28 of the airframe 22 includes components which provide other stability and maneuverability functions of the vehicle 20, such as an elevator 38, a rudder 40, a vertical stabilizer fin 42, and a horizontal stabilizer 44.

Figure 2:
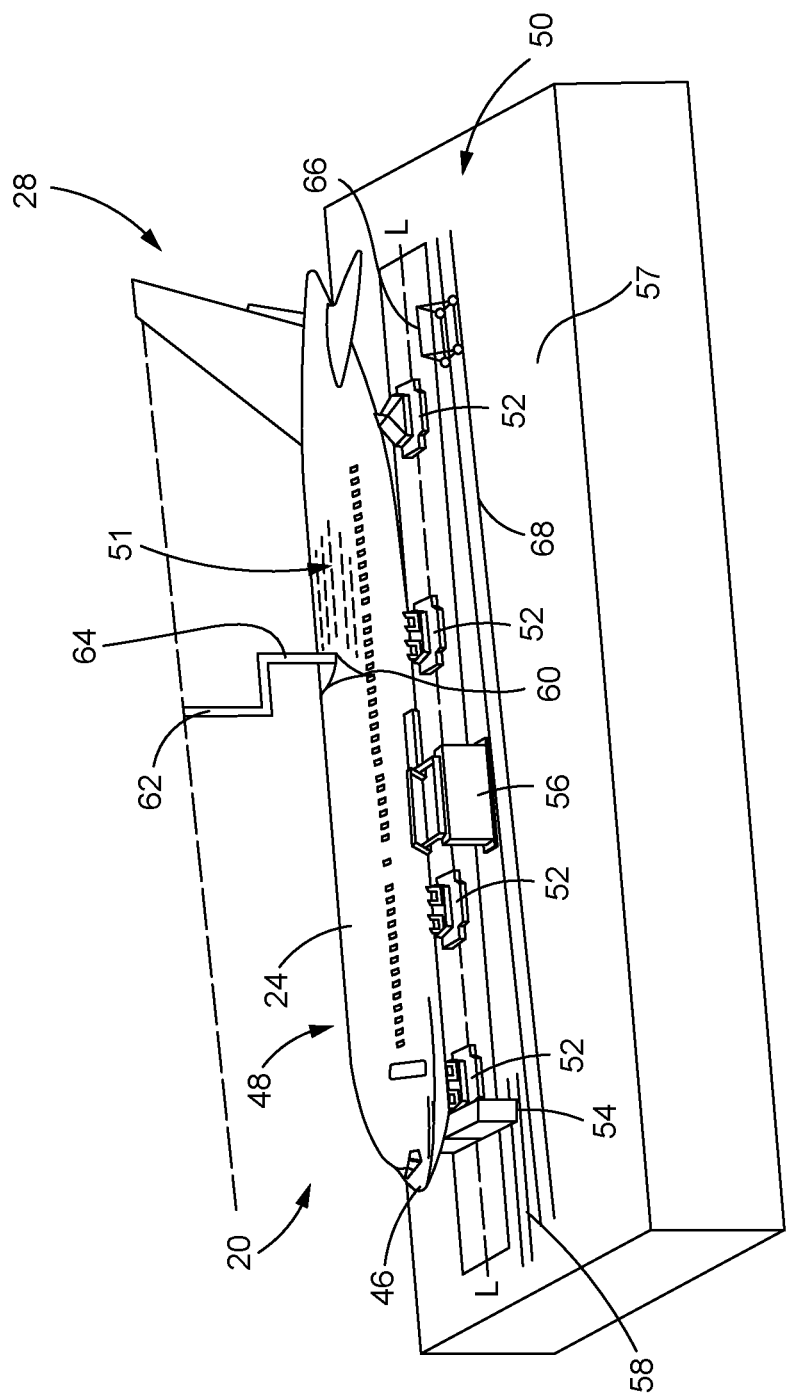
FIG. 2 is a perspective view of an exemplary contoured surface, and surface treatment support structure assembly in accordance with the present disclosure.

FIG. 2 illustrates one non-limiting example of the fuselage 24, with the tail section 28 attached. Generally, the fuselage 24 and other components of the vehicle 20 are constructed out of aluminum, aluminum alloy, titanium, carbon composite, or other known material. Moreover, the fuselage 24 forms a tubular structure of the vehicle 20, which includes a nose portion 46 designated as the front of the fuselage 24 and the tail section 28 designated as the rear of the fuselage 24. The outer surface of the fuselage 24 has changing dimensions and topography along the length of the fuselage 24 between the nose portion 46 and the tail section 28. As a result, the fuselage 24 is often described as having a contoured surface 48 or profile. In one embodiment, the contoured surface 48 includes a variety of surface profiles formed by a series of changing surface geometries of the fuselage 24 and other vehicle 20 components. For example, moving along the fuselage 24 from the nose portion 46 to the tail section 28, the contoured surface 48 exhibits changing geometries and profiles such as but not limited to, an increase in diameter of the fuselage 24, a decrease in diameter of the fuselage 24, a convex surface, a concave surface, or other such surface geometries, and profiles, or combinations thereof.

During vehicle 20 manufacture and/or servicing, the fuselage 24, and other vehicle components, is positioned within a work area 50 and prepared for one or more manufacturing and/or scheduled service steps. In some embodiments, the manufacturing and/or servicing of the vehicle 20 includes applying a surface treatment layer 51 on the contoured surface 48 along the fuselage 24, wings 26 (FIG. 1), tail section 28, or other portions of the vehicle 20. Generally, the application of the surface treatment layer 51 along the contoured surface 48 includes one or more of cleaning, abrading, priming, painting, protecting, curing, inspecting, repairing, or other known surface treatments of the contoured surface 48. Moreover, one non-limiting example of the surface treatment layer 51 includes the application of decorative livery coatings, which not only provide surface protection against the harsh environmental conditions encountered by the vehicle 20, but also create a decorative design on the fuselage 24 which helps to identify and distinguish the one vehicle 20 from another. Additionally, in some embodiments, the surface treatment layer 51 is composed of multiple layers such as, primer coatings, adhesion promoters, base coats, clear coats, livery coats, and other surface treatment layers are applied to the contoured surface 48.

As further illustrated in FIG. 2, the vehicle 20 is prepared for surface treatments by positioning the fuselage 24 within the work area 50 prior to attaching, or otherwise coupling, each wing 26 (FIG. 1) and other components to the vehicle 20. However, in alternative embodiments, such as but not limited to, during service or maintenance of the vehicle 20, surface treatment of the contoured surface 48 is possible on a fully assembled vehicle 20 with the wings 26 (FIG. 1), the tail section 28 and other components already attached. For example, in some instances, the exterior surface of the vehicle 20 is damaged during operation and the contoured surface 48 requires repair to fix the damage. As a result, the fully assembled vehicle 20 is positioned within the work area 50 and prepared for one or more surface treatments.

Prior to the start of the surface treatment, the fuselage 24 is delivered to the work area 50 by a plurality of automated guided vehicles 52 (AGVs). The AGVs 52 are positioned along the underside of the fuselage 24 to provide adequate support to the vehicle 20 and configured to move the fuselage 24 into position. While FIG. 2 shows the use of four AGVs 52, other numbers of AGVs 52 (i.e., fewer or greater) are certainly possible. Once the AGVs 52 move the fuselage 24 into the work area 50 one or more structures are positioned along the underside of the fuselage 24 to provide support during the surface treatment. In some embodiments, a vehicle nose support structure 54 is located on the underside of the nose portion 46 of the fuselage 24 and at least one vehicle central support structure 56 is positioned underneath of the central portion of the fuselage 24. Additionally, while the vehicle nose support structure 54 and the vehicle central support structure 56 are shown in FIG. 2, one or more additional support structures can be placed in other places along the fuselage 24 which require support, such as but not limited to, underneath the tail section 28 or anywhere in between the vehicle nose support structure 54 and vehicle central support structure 56.

In one non-limiting embodiment, the nose and vehicle central support structures 54, 56 are slidably coupled to the floor 57 of the work area 50 by a set of vehicle support structure rails 58. The nose and vehicle central support structures 54, 56 slides along the vehicle support structure rails 58 and are positioned underneath the fuselage 24 to ensure the fuselage 24, or other component of the vehicle 20, is properly supported. Furthermore, the nose and vehicle central support structures 54, 56 are configured such that they are able to move along the vehicle support structure rails 58 without interfering with the AGVs 52. As a result, the AGVs 52 are capable of being used along with the nose and vehicle central support structures 54, 56 to support the fuselage 24, or other component of the vehicle 20, during surface treatment. While FIG. 2 illustrates the use of AGVs 52 and the nose and vehicle central support structures 54, 56 to transport and support the fuselage 24 and other components of the vehicle 20, it will be known to those skilled in the art that other methods of positioning, supporting and transporting the fuselage 24 and other vehicle 20 components are possible.

As further illustrated in FIG. 2, the work area 50 is equipped with at least one surface treatment support structure assembly 60 that is configured to apply or otherwise treat the contoured surface 48 of the vehicle 20 with a surface treatment layer 51. In some embodiments, the surface treatment support structure assembly 60 is attached to an overhead gantry 62, which is configured to provide support and movement of the surface treatment support structure assembly 60 within the work area 50. In one non-limiting example, the overhead gantry 62 is attached to an overhead gantry structure 62 that runs the length L-L of the work area 50 that houses the fuselage 24 or other components of the vehicle 20 during surface treatment. The overhead gantry 62 is configured to move the surface treatment support structure assembly 60 along the overhead gantry structure 62 as it treats the contoured surface 48 of the vehicle 20. Furthermore, in one non-limiting example the surface treatment support structure assembly 60 includes an attachment pillar 64 which couples the surface treatment support structure assembly 60 to the overhead gantry 62.

Additionally or alternatively, the surface treatment support structure assembly 60 is mounted on a surface treatment support assembly automated guided vehicle (AGV) 66, similar to the AGVs 52 used to move the fuselage 24 in and out of the work area 50. The surface treatment support assembly AGV 66 is configured to move along the length L-L of the floor 57 of the work area 50 as the surface treatment support structure assembly 60 treats the contoured surface 48 of the vehicle 20. In one embodiment, the surface treatment support assembly AGV 66 is coupled to a set of surface treatment AGV rails 68, which are positioned laterally alongside the fuselage 24 and configured to run along the length L-L of the floor 57 of the work area 50. Furthermore, some embodiments include two sets of the surface treatment AGV rails 68 that are spaced apart within the work area 50 such that the fuselage 24 is capable of being positioned and substantially centered between the two sets of the surface treatment AGV rails 68. As a result, one or more surface treatment support structure assemblies 60 are capable of being positioned on each side of the fuselage 24 during surface treatment of the contoured surface 48. In an alternative embodiment, the surface treatment support assembly AGV 66 is configured with a set of wheels or other ground engaging elements that do not require being mounted on the surface treatment AGV rails 68. As a result, the surface treatment support assembly AGV 66 travels along the floor 57 of the work area 50 on the set of wheels or other ground engaging elements while the surface treatment support structure assembly 60 treats the contoured surface 48 of the vehicle 20. In some embodiments, a plurality of surface treatment support structure assemblies 60 are used for surface treatment of the contoured surface 48 such that one or more surface treatment support structure assemblies 60 are mounted on both the overhead gantry 62 and one or more surface treatment support assembly AGVs 66. The overhead gantry 62 and/or the surface treatment support assembly AGV 66 are arranged around the fuselage 24 to position each of the surface treatment support structure assemblies 60 adjacent to the contoured surface 48. As a result, the plurality of surface treatment support structure assemblies 60 mounted on the overhead gantry 62 and/or surface treatment support assembly AGVs 66 provide complete coverage around the circumference of the tubular fuselage 24, or other surface dimension, for surface treatment of the contoured surface 48.

Figure 4:
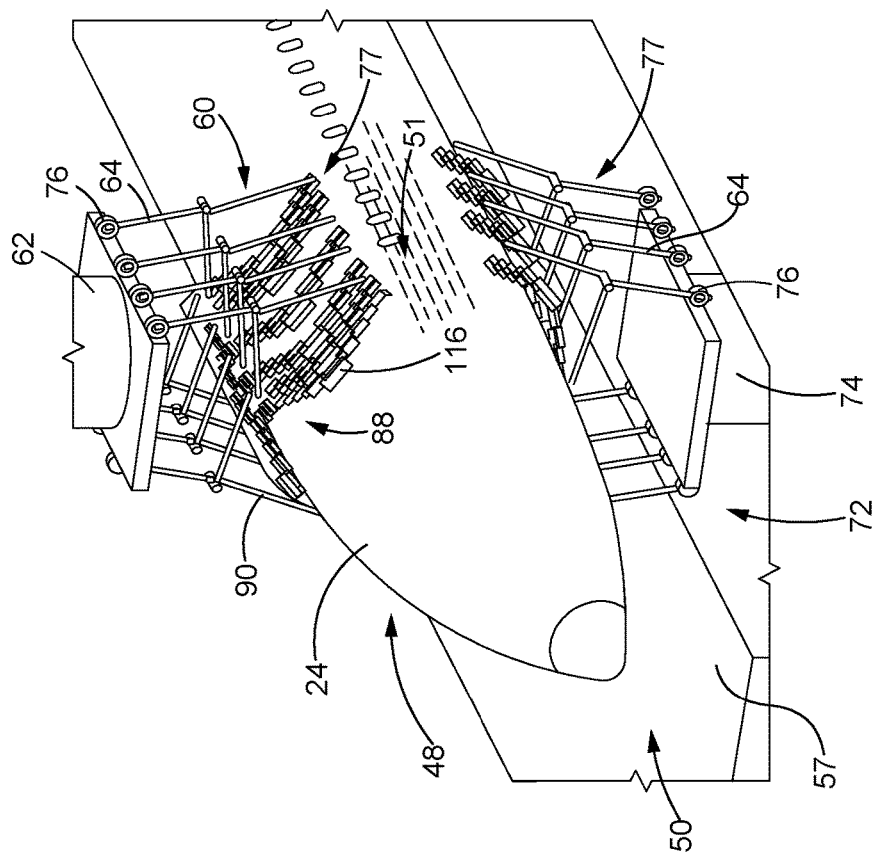
FIG. 4 is a perspective view of another embodiment of the surface treatment support structure assembly in accordance with the present disclosure.
Figure 3:
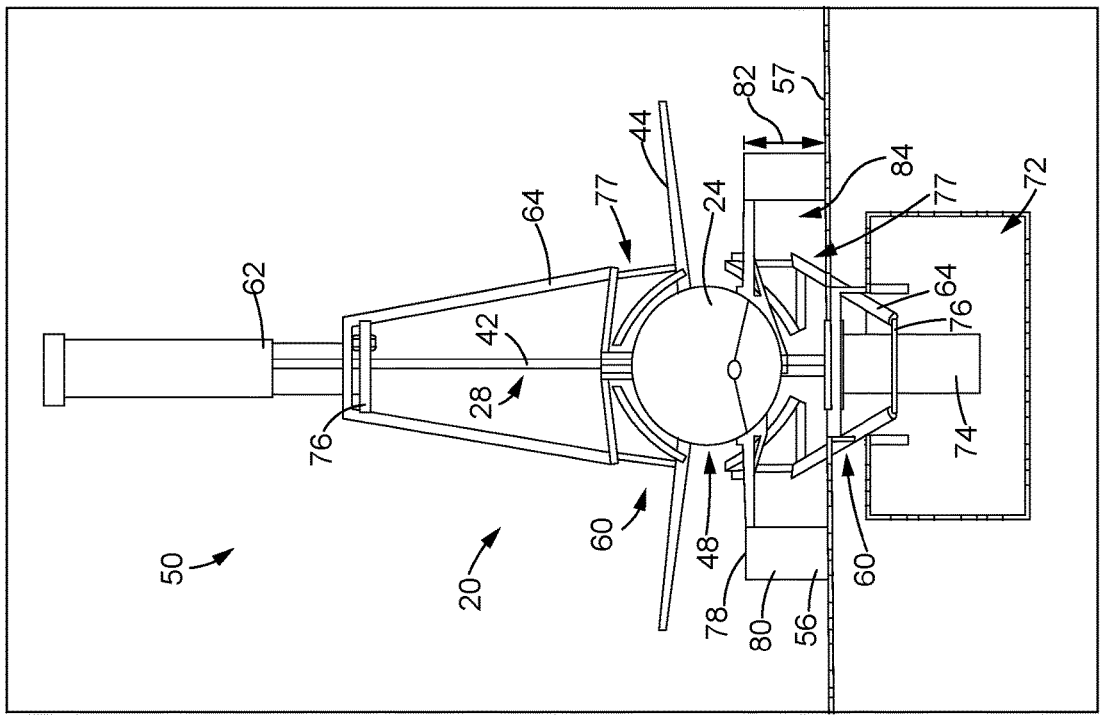
FIG. 3 is a cross-sectional view of an exemplary surface treatment support structure assembly and work area in accordance with the present disclosure.

Referring now to FIGS. 3-4, alternative embodiments of the work area 50 are illustrated. The work area 50 includes a floor pit 72 formed in the floor 57 and the floor pit 72 is configured to run the length L-L (shown in FIG. 2) of the work area 50. Additionally, the floor pit 72 includes a pit gantry 74 configured to provide support and movement to at least one surface treatment support structure assembly 60 that is operably attached to the pit gantry 74. Generally, the pit gantry 74 is configured to extend up from the bottom of the floor pit 72 and provides one or more attachment points 76 for the attachment pillar 64 of each surface treatment support structure assembly 60. Furthermore, the pit gantry 74 is attached to an underlying structure disposed within the floor pit 72 such that the pit gantry 74 is capable of moving one or more surface treatment support structure assembly 60 along the length L-L (FIG. 2) of the floor pit 72 while treating the contoured surface 48 of the fuselage 24. In some embodiments, the pit gantry 74 supports one or more surface treatment support structure assembly 60 which is positioned to treat the contoured surface 48 along the underside of the fuselage 24, or other component of the vehicle 20. However, the pit gantry 74 and the one or more surface treatment support structure assembly 60 are adjustable to position the one or more surface treatment support structure assembly 60 along the contoured surface 48 as needed.

As further shown in the FIGS. 3-4, the overhead gantry 62 and the pit gantry 74 are both configured with at least one attachment point 76 for operably coupling to at least one surface treatment support structure assembly 60. In some embodiments, each of the overhead gantry 62 and pit gantry 74 is operably coupled to more than one surface treatment support structure assembly 60, and each surface treatment support structure assembly 60 is adjacently positioned to the contoured surface 48 of the fuselage 24 to form a surface treatment support structure assembly array 77. In one non-limiting example, a plurality of surface treatment support structure assembly arrays 77 are arranged to substantially surround (i.e., circumferentially surround) the contoured surface 48 of the fuselage 24. As a result, the surface treatment layer 51 (FIG. 2) is circumferentially applied to the contoured surface 48 as the pit gantry 74 and overhead gantry 62 move along the fuselage 24. The pit gantry 74 and overhead gantry 62 are independently controlled and operated from each other. However, in one non-limiting example, the pit gantry 74 and overhead gantry 62 are synchronized such that they simultaneously move along the fuselage 24 to treat the contoured surface 48. In an alternative embodiment, the pit gantry 74 and overhead gantry 62 are positioned in a staggered fashion and treat different portions of the contoured surface 48 as they move along the fuselage 24. Moreover, in yet an additional embodiment, one of the pit gantry 74 or the overhead gantry 62 is maintained in a stationary position while the other one of the pit gantry 74 or the overhead gantry 62 is moved along the contoured surface 48 of the fuselage 24.

Additionally, the pit gantry 74 and the overhead gantry 62 position the plurality of surface treatment support structure assembly arrays 77 to minimize interference with vehicle 20 and work area 50 components. As illustrated in FIG. 4, the overhead gantry 62 and the pit gantry 74 are each configured with two surface treatment support structure assembly arrays 77, each surface treatment support structure assembly array 77 including four surface treatment support structure assemblies 60. However, other numbers and configurations of the surface treatment support structure assemblies 60 are possible in each of the surface treatment support structure assembly arrays 77.

In one non-limiting example, the tail section 28, including the vertical stabilizer fin 42, the horizontal stabilizers 44, and other such components, is attached to the fuselage 24 during surface treatment of the contoured surface 48. The plurality of surface treatment support structure assembly arrays 77 attached to the pit gantry 74 and the overhead gantry 62 are arranged to minimize interference (i.e., avoid contact) with the vertical stabilizer fin 42 and other vehicle 20 components. Moreover, the plurality of surface treatment support structure assembly arrays 77 are arranged such that as the pit gantry 74 passes by the tail section 28, the plurality of surface treatment support structure assemblies 60 attached to the pit gantry 74 pass underneath the horizontal stabilizers 44. Furthermore, the plurality of surface treatment support structure assembly arrays 77 are arranged such that as the overhead gantry 62 passes by the tail section 28, the plurality of surface treatment support structure assemblies 60 attached to the overhead gantry 62 pass on either side of the vertical stabilizer fin 42. While FIG. 3 illustrates the interaction between the tail section 28 and the pit gantry 74, the overhead gantry 62, and the plurality of surface treatment support structure assembly arrays 77, it will be understood that the pit gantry 74, the overhead gantry 62 and the plurality of surface treatment support structure assemblies 60 are also configured to minimize interference with other components of the vehicle 20 such as but not limited to, each wing 26, and propulsion unit 30 and other such components (see FIG. 1).

Furthermore, the pit gantry 74 and the overhead gantry 62 position the plurality of surface treatment support structure assemblies 60 to minimize interference (i.e., avoid contact) with the vehicle central support structures 56, the vehicle nose support structure 54 (FIG. 2) and other structures and equipment that is present within the work area 50. As described above, support structures such as, the vehicle central support structures 56 and the vehicle nose support structure 54 (FIG. 2) are located in the work area 50 and configured to support the fuselage 24 and other components of the vehicle 20 during the surface treatment of the contoured surface 48. In one non-limiting example, the vehicle central support structures 56 include a horizontal portion 78 that is substantially parallel to the floor 57 and supports an underside portion of the fuselage 24. The horizontal portion 78 of the vehicle central support structure 56 extends laterally away from the fuselage 24 to a vertical portion 80 of the vehicle central support structure 56 which is supported or otherwise fixed to the floor 57 of the work area 50. Moreover, the vertical portion 80 of the vehicle central support structure 56 is positioned laterally outside the floor pit 72 and is configured with a height 82 such that an area 84 of the vehicle central support structure 56 is defined by the horizontal portion 78 and vertical portion 80 of the vehicle central support structure 56 underneath the fuselage 24. The area 84 of the vehicle central support structure 56 is configured to provide clearance for the pit gantry 74 and the plurality of surface treatment support structure assembly arrays 77 as they pass by the vehicle central support structures 56 during surface treatment of the contoured surface 48. Moreover, the overhead gantry 62 and plurality of surface treatment support structure assembly arrays 77 are arranged and positioned to avoid interference with the vehicle central support structures 56 as they move along the contoured surface 48 of the fuselage 24.

Referring to FIG. 5, an enlarged portion of an exemplary surface treatment support structure assembly 60 is shown. The surface treatment support structure assembly 60 includes a plurality of base structures 86 that are operably coupled with one another to form a base structure array 88 including nine base structures 86; however alternative numbers of base structures 86 are possible. Additionally, the surface treatment support structure assembly 60 includes at least two attachment arms 90 which are coupled to the base structure array 88 at an arm first end 92 and coupled to the attachment pillar 64 at an arm second end 94. In some embodiments, an attachment arm actuator 95 is operatively coupled to the arm second end 94 and the attachment pillar 64 such that the attachment arms 90 are adjusted or otherwise articulated to manipulate the base structure array 88 between at least a first position (i.e., first radius) and a second position (i.e., second radius). For example, in FIG. 5 the attachment arms 90 are adjusted such that the arm first ends 92 of each attachment arm 90 are spread apart, and as a result, the base structure array 88 is in an expanded position and arranged in a v-shaped configuration. However, other shapes and arrangements of the base structure array 88 are possible. Additionally, while two attachment arms 90 are illustrated in FIG. 5, it will be understood that an alternate number and configuration of the attachment arms 90 are possible to support and articulate the plurality of base structures 86.

Moreover, each of the attachment arms 90 include a first rotatable joint 96 at the arm first end 92 and a second rotatable joint 98 at the arm second end 94. In some embodiments, each of the attachment arms 90 have an arm longitudinal axis 100, each of the first rotatable joints 96 have a first joint axis 102, and each of the second rotatable joints 98 have a second joint axis 104. As a result, the surface treatment support structure assembly 60 is made adjustable about a plurality of axes in order to conform with and follow the variety of surface geometries and profiles (i.e., increased/decreased diameter and convex/concave surfaces) encountered along the contoured surface 48 or the fuselage 24, or other component of the vehicle 20 (FIG. 1). For example, in some embodiments, the first joint axis 102 is orientated perpendicular to the arm longitudinal axis 100 such that the first rotatable joint 96 rotates about both the arm longitudinal axis 100 and the first joint axis 102 to adjust the plurality of base structures 86 relative to the contoured surface 48 of the fuselage 24 and other such components of the vehicle 20. Additionally, the second rotatable joint 98 rotates about the arm longitudinal axis 100 and the second joint axis 104 to further adjust and position the plurality of base structures 86 such that the surface treatment support structure assembly 60 is adjustable between at least the first and second positions such that the base structure array 88 maintains a proper orientation (i.e., normal) relative to the contoured surface 48.

Furthermore, each of the plurality of base structures 86 included in the base structure array 88 are configured with one or more adjustment devices to individually adjust each of the base structures 86 relative to the contoured surface 48. For example, each base structure 86 is independently adjustable such that each of the base structures 86 of the base structure array 88 maintains proper positioning (i.e., normal orientation and distance) relative to the contoured surface 48. As illustrated in FIG. 6, with continued reference to FIG. 5, each of the base structures 86 are operably coupled with respect to one another and configured to slide along a base structure longitudinal axis 106 defined by a longitudinal slot 108 or other such aperture formed along a portion of each base structure 86. Additionally, each base structure 86 is configured with at least one base structure actuator 110 such as but not limited to a linear actuator, a radial actuator, or any other known such actuating device. In one non-limiting example, each base structure 86 includes a plurality of base structure actuators 110 configured to slide each base structure 86 along the base structure longitudinal axis 106, rotate each base structure 86 about the base structure longitudinal axis 106, or other such actuation of the base structure 86. For example, at least one of the plurality of base structure actuators 110 is configured as a linear actuator device which slides each base structure 86 as the surface treatment support structure assembly 60 is articulated between at least the first position and the second position to expand and/or collapse the base structure array 88. Furthermore, at least one of the plurality of base structure actuators 110 is configured as a rotary actuator configured to rotate about a base structure pivot point 112. In some embodiments, each base structure 86 is rotatably actuated based on the topography of the contoured surface 48 in order to maintain a proper distance and a normal orientation of each base structure 86 relative to the contoured surface 48 of the fuselage 24 or other component of the vehicle 20.

The actuation and adjustment of the surface treatment support structure assembly 60 and each individual base structure 86 enables a versatile and resilient response to the complex geometry and contour encountered along the contoured surface 48. As further shown in FIG. 5, some embodiments of the surface treatment support structure assembly 60 include at least one sensor 114 mounted or otherwise coupled to each of the base structures 86. The sensors 114 are configured to scan and collect surface profile and other such data of the contoured surface 48, and the collected data is used in the actuation and adjustment of the surface treatment support structure assembly 60. The sensors 114, such as but not limited to, a vision sensor (i.e., camera), a laser scanning topography and surface height sense sensor (i.e., LIDAR), and other such surface metrology sensors are configured to scan and monitor the topography and other geometries of the contoured surface 48 such that the each of the base structures 86 maintains a normal orientation and distance relative to the contoured surface 48. Moreover, the continuous actuation and adjustment of the plurality of surface treatment support structure assemblies 60 provides improved accuracy in the application of the surface treatment layer 51, as well as reduces the amount of time required to treat the contoured surface 48.

Referring back to FIG. 4 a plurality of surface treatment support structure assembly arrays 77 are shown attached to the overhead gantry 62 and the pit gantry 74. In some embodiments, surface treatment support structure assembly arrays 77, including a plurality of base structure arrays 88, are configured to treat the contoured surface 48 of the fuselage 24. Moreover, each individual base structure 86 is adapted to hold and position at least one surface treatment applicator head 116 such as but not limited to, an abrasion ring, a paint nozzle, an ink jet print head, a dry/cure and inspection ring, a heater, an UV emitter, and other known applicator heads. Furthermore, in some embodiments, each surface treatment applicator head 116 and base structure 86 is interchangeably configured such that the type of surface treatment applicator head 116 attached to the individual base structures 86 depends on the desired surface treatment.

For example, to clean and abrade the contoured surface 48 the surface treatment applicator head 116 attached to each base structure 86 is the abrasion ring, while to apply a primer, adhesion promoter, a base coat, and/or a clear coat layer to the contoured surface 48 the surface treatment applicator head 116 attached to each base structure 86 is a paint nozzle. Furthermore, to apply a decorative livery coating on the contoured surface 48 the surface treatment applicator head 116 attached to each base structure 86 is the ink jet print head, and to dry cure and inspect the surface treatment along the contoured surface 48 the surface treatment applicator head 116 attached to each base structure 86 is the dry/cure and inspection ring. It will be understood that the abrasion ring, paint nozzle, ink jet print head, and dry/cure and inspection ring, heater, UV emitter, and other known applicator heads are non-limiting examples of the surface treatment applicator heads 116 which are mounted or otherwise attached to the base structure arrays 88. Other known surface treatment applicator heads 116 are used by the plurality of surface treatment support structure assemblies 60 to complete the desired task. Furthermore, in some embodiments, a plurality of surface treatment support structure assembly arrays 77 and/or base structure arrays 88 are assembled for the various surface treatments (i.e., cleaning, abrading, priming, painting, protecting, curing, inspecting, or repairing) and the arrays are interchanged, instead of individual surface treatment applicator heads 116, depending upon the desired surface treatment.

In some embodiments, the surface treatment layer 51 is composed of a single surface coating and is dispensed in a single pass along the contoured surface 48. However, additional numbers of passes are performed to apply the surface treatment layer 51 along the contoured surface 48, as needed. In one non-limiting example, a plurality of surface treatment support structure assembly arrays 77 are configured to apply a plurality of treatment and coatings to the contoured surface 48 that are combined to form the surface treatment layer 51. The surface treatment support structure assembly array 77 and selected surface treatment applicator heads 116 provide one treatment or coating at a time along the contoured surface 48 of the fuselage 24. As a result, the surface treatment support structure assembly 60 makes one or more passes to dispense each of the plurality of coatings that comprise the surface treatment layer 51. Alternatively, two or more surface treatment support structure assemblies 60 are configured to each apply a single coating as each of the two or more surface treatment support structure assembly 60 move along the contoured surface 48 of the fuselage 24 to dispense the plurality of coatings that comprise the surface treatment layer 51.

Figure 7:
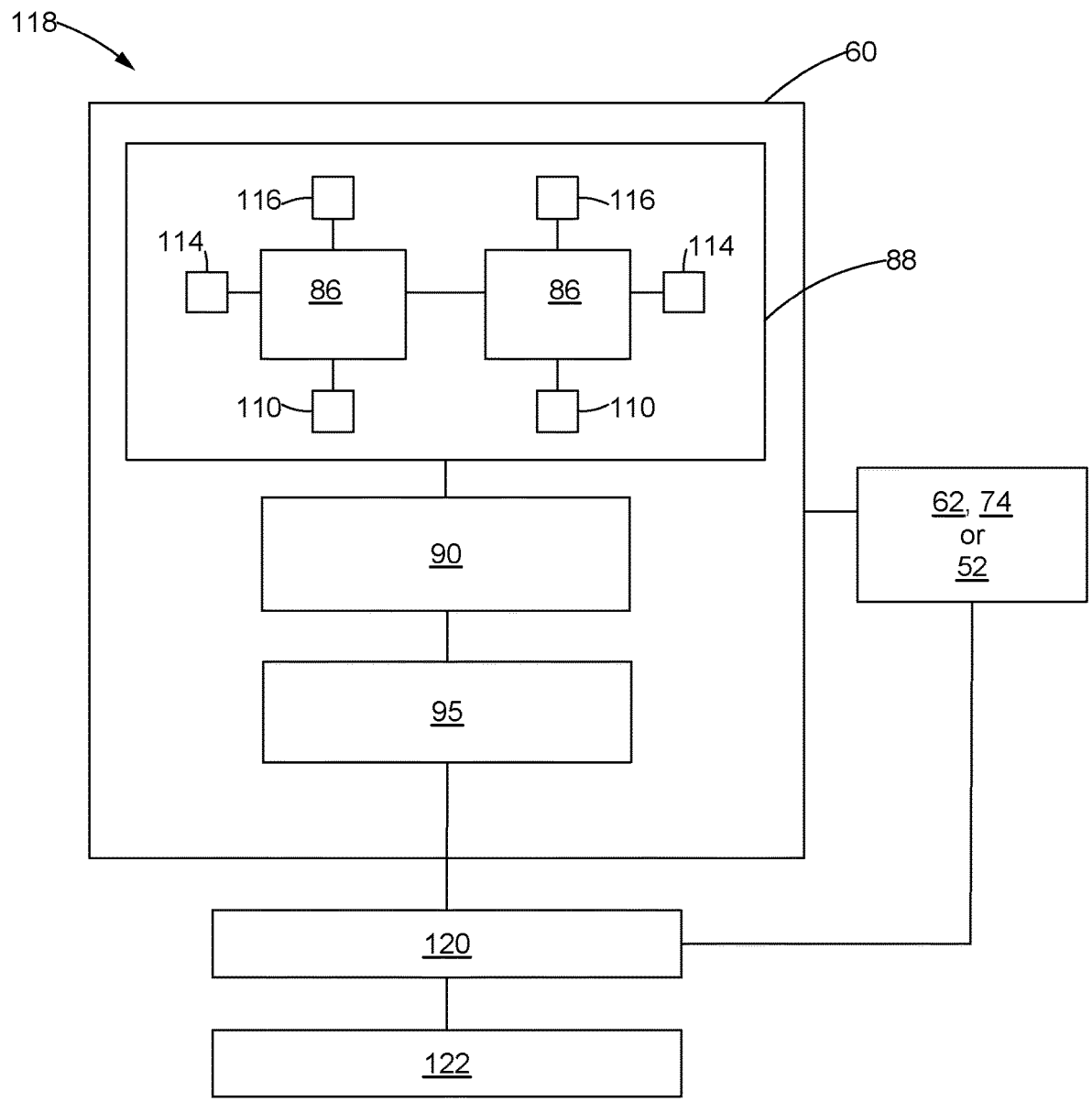
FIG. 7 is a schematic view of an exemplary control and communication system in accordance with the present disclosure.

FIG. 7, with continued reference to FIGS. 2-6, illustrates a schematic of a control and communication system 118 that is configured to operate the overhead gantry 62, the pit gantry 74 and at least one surface treatment support structure assembly 60. The control and communication system 118 is composed of a controller 120 and an input/output terminal 122 which is communicably coupled to the controller 120. Furthermore, the controller 120 is programmed to control the movement of the overhead gantry 62, the pit gantry 74, and the surface treatment support structure assembly 60. Additionally or alternatively, the surface treatment support structure assembly 60 is attached to one or more AGVs 52 configured to move about the work area 50. In such cases, the controller 120 is programmed to control movement of the AGVs 52, the surface treatment support structure assembly 60 and any other such components. Furthermore, the controller 120 is programmed to monitor and adjust the position of each base structure 86 of the base structure array 88 and the plurality of surface treatment applicator heads 116. In some embodiments, the controller 120 and the input/output terminal 122 are located remotely from the work area 50 (FIG. 2). As a result, communication between the controller 120, the input/output terminal 122, the surface treatment support structure assembly 60 and other such component of the control and communications system 118, is established using a radio frequency network, a computer data network, a Wi-Fi data network, a cellular data network, a satellite data network, or any other known data communication network. Alternatively, the controller 120 and the input/output terminal 122 are configured to be proximally located in the work area 50 (FIG. 2) and set up in a position adjacent to the surface treatment support structure assembly 60. In the proximally located configuration, the controller 120 and the input/output terminal 122 are still configured to communicate using a radio frequency network a computer data network, a Wi-Fi data network, a cellular data network, a satellite data network or any other known communication network.

A user of the control and communication system 118, such as an operator, a supervisor, or other interested personnel, can access the controller 120 using the input/output terminal 122. In some embodiments, the input/output terminal 122 allows for commands and other instructions to be input through a keyboard, mouse, dial, button, touch screen, microphone or other known input devices. Furthermore, data and other information generated by the control and communication system 118 and the controller 120 will be output to the input/output terminal 122 through a monitor, touch screen, speaker, printer, or other known output device for the user. In some embodiments, the input/output terminal 122 is communicably coupled to the controller 120 through a wired connection. Alternatively, the input/output terminal 122 is communicably coupled to the controller 120 through a wireless communication network such as Bluetooth, near-field communication, a radio frequency network, a computer data network, a Wi-Fi data network, a cellular data network, a satellite data network or any other known data communication network. In some embodiments, the input/output terminal 122 is a handheld mobile device, such as a tablet computer, a smart phone device, or other such mobile device, and the handheld mobile device is wirelessly coupled to the controller 120. As a result, one or more users of the control and communication system 118 can access the controller 120, each user having a different handheld input/output terminal 122 that is remotely located from the controller 120 and/or the surface treatment support structure assembly 60. Such a configuration will allow for the flexibility in monitoring and operating the control and communication system 118 during treatment of the contoured surface 48 of the fuselage 24.

In some embodiments, the controller 120 of the control and communication system 118 is composed of one or more computing devices that are capable of executing a control mechanism and/or software which allows the user to direct and control the surface treatment support structure assembly 60. The one or more computing devices of the controller 120 are programmed to control the movement of the overhead gantry 62, the pit gantry 74, the surface treatment AGV 52, or other movement device, to move and position the at least one surface treatment support structure assembly 60 along the contoured surface 48 of the fuselage 24. Furthermore, the one or more computing devices of the controller 120 are programmed to control the actuation and adjustment of the surface treatment support structure assembly 60 in order to properly position the surface treatment support structure assembly 60 relative to the contoured surface 48. In one exemplary application of the control and communication system 118, the user is able to use the controller 120 and input/output terminal 122 to program a pattern or process for the surface treatment support structure assembly 60 to follow while applying the surface treatment layer 51 or other such treatment along the contoured surface 48. Furthermore, the communicably coupling of the controller 120, the input/output terminal 122, and the surface treatment support structure assembly 60 using a communication network allows for two-way communication such that commands sent by the controller 120 are received by the surface treatment support structure assembly 60, and data collected by the surface treatment support structure assembly 60 is sent to and received by the controller 120.

In an embodiment, at least one sensor 114 such as but not limited to, a vision sensor (i.e., camera), a laser scanning topography and surface height sense sensor (i.e., LIDAR), and other such surface metrology sensor, is incorporated into the surface treatment support structure assembly 60 and communicably coupled to the controller 120 and the input/output terminal 122. In some embodiments, each base structure 86 of the surface treatment support structure assembly 60 includes the sensor 114 configured to scan and monitor the surface topography and other geometries of the contoured surface 48. The data collected by the sensors 114 is transmitted to and utilized by the controller 120. Furthermore, the controller 120 is programmed to store, analyze and extract information from the data collected by the plurality of sensors 114 and use the extracted information to control and adjust the surface treatment support structure assembly 60, as well as the individual base structures 86.

Furthermore, the at least one sensor 114 and the controller 120 are operably coupled which enables them to work together to collect data on the contoured surface 48 such as but not limited to, detect a change in the radius of the fuselage 24, collect imaging and vision data of the contoured surface 48, provide a topographical map and surface profile of the contoured surface 48, provide positioning and location data of the surface treatment support structure assembly 60, and provide any other such surface data collected by the at least one sensor 114. The collected data is then transmitted by the at least one sensor 114 and received by the controller 120 such that the control mechanism and/or software of the controller 120 is able to utilize the data to make adjustments to the control and operation of the overhead gantry 62, the pit gantry 74, the surface treatment support structure assembly 60, individual base structures 86, and other such components. Additionally, the user is able to view the data collected by the at least one sensor 114 on the input/output terminal 122, and if necessary, make adjustments to the control commands sent from the controller 120 to the overhead gantry 62, the pit gantry 74, the surface treatment support structure assembly 60, individual base structures 86, and other such components. In some embodiments, the control and communication system 118 is capable of making real time adjustments to the overhead gantry 62, the pit gantry 74, the surface treatment support structure assembly 60, individual base structures 86, and other such components through the two-way communication link established between the surface treatment support structure assembly 60 and the control and communication system 118.

Figure 8:
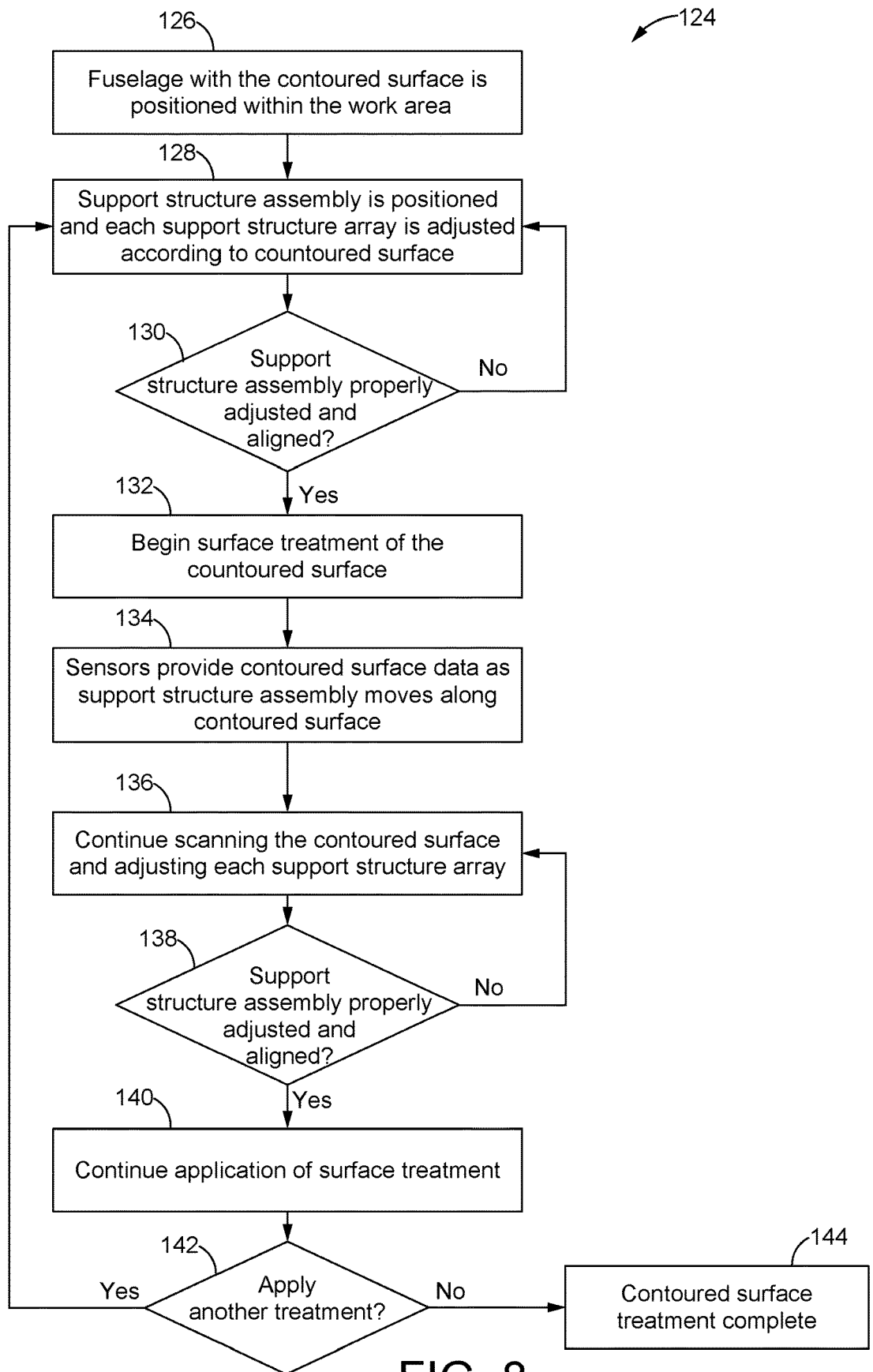
FIG. 8 is a flowchart illustrating an exemplary method of treating a contoured surface with the surface treatment support structure assembly in accordance with the present disclosure.

Referring now to FIG. 8 and with continued reference to the proceeding FIGS. 1-7, a flowchart illustrating an exemplary surface treatment method or process 124 of treating a contoured surface 48 with a surface treatment support structure assembly 60 is illustrated. In a first block 126 of the method 124 of treating the contoured surface 48 with a surface treatment support structure assembly 60, a structure having a contoured surface 48, such as the fuselage 24, is moved into position for surface treatment within the work area 50. In one non-limiting example the fuselage 24 is transported into the work area 50 by one or more AGVs 52 and delivered to the vehicle nose support structure 54, the vehicle central support structure 56, or other support structures. During surface treatment, the fuselage 24 is supported by the nose and vehicle central support structures 54, 56, the one or more AGVs 52 and any other support structures that may be needed.

In one non-limiting example, the surface treatment includes the removal of any protective or previously applied coatings on the contoured surface 48, masking certain areas of the contoured surface 48 not to be treated, abrading, cleaning, and drying the contoured surface 48, applying a surface protective coating, an adhesion promoting coating, a primer coating, a basecoat coating, a sol-gel coating, a top layer coating, a decorative livery coating, a clear coating, and/or other protective coatings and/or preparation treatments. Furthermore, prior to the start of the treatment of the contoured surface 48, in a next block 128 at least one surface treatment support structure assembly 60 is positioned within the work area 50 and adjusted and aligned along the contoured surface 48 of the fuselage 24. In one non-limiting example, a plurality of surface treatment support structure assemblies 60 is arranged into one or more surface treatment support structure assembly arrays 77 which are attached to the overhead gantry 62, and/or the pit gantry 74. Moreover, during the adjustment and alignment of the plurality of surface treatment support structure assembly arrays 77 at least one sensor 114 is attached to the surface treatment support structure assembly arrays 77 and configured to scan and collect the surface topography data of the contoured surface 48. The surface topography data or contoured data set is then transmitted to and received by the controller 120 of the control and communication system 118 and utilized to adjust command and control parameters of the surface treatment support structure assembly arrays 77 relative to the contoured surface 48.

According to a next block 130, prior to any surface treatment of the contoured surface 48, an adjustment check is performed to confirm that the one or more surface treatment support structure assembly arrays 77 of the surface treatment support structure assembly 60, as well as each individual base structure 86, are properly adjusted and aligned relative to the contoured surface 48. In some embodiments, the adjustment check includes confirmation of the proper distance or gap between the contoured surface 48 and each base structure 86. Additionally the adjustment check confirms that each base structure 86 is in a normal and orthogonal orientation relative to the contoured surface 48. Failure to properly adjust and align each base structure 86 of the surface treatment support structure assembly 60 relative to the contoured surface 48 will result in a defective surface treatment such as, a non-uniform application of the surface treatment layer 51, or other such surface treatment defect. Therefore, if the inspection fails the set of pre-determined adjustment criteria which are input into and stored in the controller 120, then the surface treatment support structure assembly 60 continues adjustment of the one or more surface treatment support structure arrays 77 and each base structure 86 to correct any adjustment errors. In some embodiments, the operator or other user of the surface treatment assembly will be notified of the adjustment errors and instructed to make the necessary adjustment and alignment of the surface treatment support structure assembly 60.

Once the surface treatment support structure assembly 60 is properly adjusted and aligned, then in a next block 132 the surface treatment support structure assembly 60 starts the desired treatment of the contoured surface 48. In some embodiments, each of the base structures 86 of the surface treatment support structure assembly 60 are interchangeably coupled to at least one surface treatment applicator head 116 such as but not limited to, an abrasion ring, a paint nozzle, an ink jet print head, a dry/cure and inspection ring, a heater, an UV emitter, and other known applicator heads. The surface treatment applicator head 116 is chosen based on the desired surface treatment of the contoured surface 48. Typically, the surface treatment support structure assembly 60 begins the treatment of the contoured surface 48 at the tail section 28 of the vehicle 20 and moves along the fuselage 24 towards the nose portion 46. Alternatively, the surface treatment support structure assembly 60 is aligned and adjusted at an intermediate location between the tail section 28 and the nose portion 46 and the surface treatment support structure assembly 60 performs the surface treatment of the contoured surface 48 where directed.

In a next block 134 the surface treatment support structure assembly 60 continues moving along the contoured surface 48, and at least one sensor 114 continues to scan and collect data of the contoured surface 48 topography. In some embodiments, the data collected by the sensor 114 is utilized by the controller 120 to make real-time adjustments to the surface treatment support structure assembly 60 as it moves along the contoured surface 48. For example, each base structure 86 of the surface treatment support structure assembly 60 is continuously adjusted to maintain a normal and orthogonal orientation with the contoured surface 48. Furthermore, the controller 120 continues to analyze the surface topography data collected by the at least one sensor 114 as the surface treatment support structure assembly 60 continues to move along the contoured surface 48 of the fuselage 24.

As a result, in a next block 136 the control and communication system 118, which includes the controller 120, will continuously perform adjustment checks to confirm that each base structure 86 of the surface treatment support structure assembly 60 is properly adjusted, aligned, and orientated with the contoured surface 48. In some embodiments, if one or more of the base structures 86 are out of adjustment, alignment, and/or orientation, then the controller 120 will transmit an adjustment control signal to the surface treatment support structure assembly 60 to adjust or readjust each of the base structures 86. In a next block 138, if it is determined that one or more base structures 86 remain out of alignment, then the surface treatment support structure assembly 60 stops moving along the contoured surface 48 of the fuselage 24 in order to perform the readjustment. In some embodiments, the method 124 of treating a contoured surface 48 returns to block 136 for readjustment of the base structures 86 of the surface treatment support structure assembly 60. In an alternative embodiment, the surface treatment support structure assembly 60 moves along the contoured surface 48 at a slower pace in order to perform the readjustment and realignment of the base structures 86.

Provided the surface treatment support structure assembly 60 passes the continuous adjustment, alignment, and orientation checks, then in a next block 140 the surface treatment support structure assembly 60 will continue moving along the contoured surface 48. In a next block 142, when the surface treatment support structure assembly 60 reaches the nose portion 46, or other pre-determined stopping point along the fuselage 24, the controller 120 makes a determination of whether another surface treatment is required. If another treatment is required, then in one non-limiting example, the method 124 of treating a contoured surface 48 returns to block 128 and the appropriate surface treatment applicator head 116 is coupled to each base structure 86, and the surface treatment support structure assembly 60 is positioned at the designated starting position (i.e., the nose portion 46, the tail section 28 or alternative pre-determined starting point) and prepares for the next surface treatment along the contoured surface 48 of the fuselage 24. In some embodiments, the same surface treatment support structure assembly 60 is used for the subsequent surface treatment and the surface treatment applicator heads 116 are exchanged depending on the desired surface treatment. Alternatively, subsequent surface treatments are performed to the contoured surface 48 using one or more additional surface treatment support structure assembly 60 configured with the desired surface treatment applicator heads 116. Once all of the desired surface treatments have been performed to the contoured surface 48, then in a next block 144 the surface treatment method 124 is concluded and the fuselage 24 is moved on to the next manufacturing or service step.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A surface treatment support structure assembly for treating a contoured surface, the surface treatment support structure assembly comprising:
    a support structure array formed from a plurality of base structures with respective base structure actuators partially disposed within each respective base structure, a first base structure in the plurality of base structures being coupled via a first base structure actuator to a second base structure in the plurality of base structures and configured to slide along a longitudinal axis formed along a portion of the first base structure and rotate about a laterally translating axis perpendicular to the longitudinal axis responsive to actuation from the first base structure actuator, the first base structure is individually adjustable from the second base structure;
    at least one applicator head coupled to each base structure of the support structure array, each of the at least one applicator head being configured to treat the contoured surface; and
    the plurality of base structure actuators, with at least one base structure actuator in the plurality of base structure actuators operatively coupled to and configured to manipulate a respective base structure in the plurality of base structures along the longitudinal axis and the laterally translating axis such that the base structures forming the support structure array are individually adjusted relative to the contoured surface.

2. The surface treatment support structure assembly of claim 1, wherein the support structure array is operatively coupled to a first attachment arm and a second attachment arm, and the first and second attachment arms further include an attachment arm actuator that is manipulated to adjust the support structure array between a first contoured shape and a second contoured shape.

3. The surface treatment support structure assembly of claim 2, wherein the first contoured shape comprises a first radius and the second contoured shape comprises a second radius.

4. The surface treatment support structure assembly of claim 2, wherein the first attachment arm comprises a first base structure joint and the second attachment arm comprises a second base structure joint, and each of the first and second base structure joints being rotatably coupled to the support structure array and configured to respectively rotate about a first attachment arm axis, a first base structure joint axis, a second attachment arm axis, and a second base structure joint axis.

5. The surface treatment support structure assembly of claim 4, wherein the first attachment arm further comprises a first attachment pillar joint and the second attachment arm further comprises a second attachment pillar joint, and each of the first and second pillar joints is rotatably attached to a support pillar and configured to rotate about the respective first and second attachment arm axes.

6. The surface treatment support structure assembly of claim 2, further comprising a sensor coupled to each base structure configured to detect an existing shape of the contoured surface and generate a contoured data set.

7. The surface treatment support structure assembly of claim 6, further comprising a controller communicably coupled to the sensor, the base structure actuator and the attachment arm actuator, wherein the controller is programmed to receive a signal from the sensor and control the base structure actuator and the attachment arm actuator to manipulate the support structure array based on the contoured data set.

8. The surface treatment support structure assembly of claim 1, wherein the at least one applicator head comprises one of an abrasion head, an inspection head, a heater, an UV emitter, a spray nozzle, and an inkjet printing head configured to apply a surface treatment to the contoured surface.

9. A method of treating a contoured surface with a surface treatment support structure assembly, the method comprising:
    forming a support structure array from a plurality of base structures with respective base structure actuators partially disposed within each respective base structure, a first base structure in the plurality of base structures being coupled via a first base structure actuator to a second base structure in the plurality of base structures and configured to slide along a longitudinal axis formed along a portion of the first base structure and rotate about a laterally translating axis which is perpendicular to the longitudinal axis responsive to actuation from the first base structure actuator, the first base structure individually adjustable from the second base structure;
    coupling at least one applicator head to each base structure of the support structure array, each of the at least one applicator head configured to treat the contoured surface; and
    coupling the plurality of base structure actuators to the plurality of base structures, with at least one base structure actuator in the plurality of base structure actuators operatively coupled and configured to manipulate a respective base structure along the longitudinal axis and the laterally translating axis such that the base structures forming the support structure array are individually adjusted relative to the contoured surface.

10. The method of claim 9, wherein the support structure array is operatively coupled to a first attachment arm and a second attachment arm, and adjusting the support structure array comprises activating an attachment arm actuator to adjust the support structure array between a first contoured shape and a second contoured shape.

11. The method of claim 10, wherein adjusting the support, structure array between the first contoured shape and the second contoured shape comprises adjusting between a first radius and a second radius.

12. The method of claim 10, wherein the first attachment arm comprises a first base structure joint and the second attachment arm comprises a second base structure joint and each of the first and second base structure joints are rotatably coupled to the support structure array, and adjusting the support structure array comprises respectively rotating the first and second attachment arms about a first attachment arm axis, a first base structure joint axis, a second attachment arm axis, and a second base structure joint axis.

13. The method of claim 12, wherein the first attachment arm further comprises a first attachment pillar joint rotatably attached to a support pillar and the second attachment arm further comprises a second attachment pillar joint rotatably attached to the support pillar, and adjusting the support structure array further comprises rotating the first and second attachment pillar joints about the respective first and second attachment arm axes.

14. The method of claim 10, further comprising a sensor coupled to each base structure and manipulating each base structure includes the sensor detecting an existing shape of the contoured surface and generating a contoured data set.

15. The method of claim 14, further comprising a controller communicably coupled to the sensor, the base structure actuator, and the attachment arm actuator, and manipulating the support structure array comprises programming the controller to receive a signal from the sensor and controlling the base structure actuator and the attachment arm actuator to manipulate the support structure array based on the contoured data set.

16. The method of claim 9, wherein coupling the at least, one applicator head to the base structure comprises one of an abrasion head, an inspection head, a heater, an UV emitter, a spray nozzle, and an ink jet printing head to apply a surface treatment to the contoured surface.

17. A surface treatment support structure assembly system for treating an exterior surface of an airplane, the surface treatment support structure assembly system comprising:
a plurality of support structure arrays formed from a plurality of base structures with respective base structure actuators partially disposed within each respective base structure, each base structure coupled via a first base structure actuator to one another and configured to slide along a longitudinal axis formed along a portion of each base structure and rotate about a laterally translating axis which is perpendicular to the longitudinal axis responsive to actuation from the first base structure actuator;
at least one applicator head coupled to each base structure, each of the at least one applicator head configured to treat a contoured surface along the exterior surface of the airplane;
the base structure actuator operatively coupled to and configured to manipulate a respective base structure along the longitudinal axis and the laterally translating axis; and
a controller communicably coupled to the base structure actuator and programmed to control the base structure actuator to manipulate the plurality of support structure arrays between a first contoured shape having a first radius and a second contoured shape having a second radius and relative to the contoured surface along the exterior surface of the airplane.

18. The surface treatment support structure assembly system of claim 17, Wherein each support structure array is operatively coupled to a first attachment arm and a second attachment arm, and the first and second attachment arms further include an attachment arm actuator that is communicably coupled to the controller and manipulated to adjust each support structure array between the first contoured shape having the first radius and the second contoured shape having the second radius.

19. The surface treatment support structure assembly system of claim 18, wherein the first attachment arm comprises a first base structure joint and a first attachment pillar joint, the second attachment arm comprises a second base structure joint and a second attachment pillar joint, each of the first and second base structure joints are rotatably coupled to the support structure array and configured to rotate about a first attachment arm axis and a respective first base structure joint and a second base structure joint, and each of the first and second pillar joints are rotatably attached to a support pillar configured to rotate about the first and second attachment arm axes.

20. The surface treatment support structure assembly system of claim 18, further comprising a sensor coupled to each base structure and configured to detect an existing shape of the contoured surface and generate a contoured data set, wherein the sensor is communicably coupled to the controller, the controller is programmed to receive a signal from the sensor and control the base structure actuator and the attachment arm actuator to manipulate each support structure array based on the contoured data set.

* * * * *